United States Patent
Klein

(10) Patent No.: US 9,772,936 B2
(45) Date of Patent: Sep. 26, 2017

(54) DATA COLLECTION AND COMPRESSION IN A SOLID STATE STORAGE DEVICE

(75) Inventor: Dean Klein, Eagle, ID (US)

(73) Assignee: Micron Technology, Inc., Boise, ID (US)

( * ) Notice: Subject to any disclaimer, the term of this patent is extended or adjusted under 35 U.S.C. 154(b) by 1866 days.

(21) Appl. No.: 12/170,612

(22) Filed: Jul. 10, 2008

(65) Prior Publication Data

US 2010/0011150 A1 Jan. 14, 2010

(51) Int. Cl.
*G06F 12/02* (2006.01)

(52) U.S. Cl.
CPC .... *G06F 12/0246* (2013.01); *G06F 2212/401* (2013.01)

(58) Field of Classification Search
CPC ............................................. G06F 2212/7205
USPC .................. 365/185.01–185.33; 711/103
See application file for complete search history.

(56) References Cited

U.S. PATENT DOCUMENTS

| | | | | |
|---|---|---|---|---|
| 5,337,275 | A * | 8/1994 | Garner | 365/189.16 |
| 5,459,850 | A * | 10/1995 | Clay et al. | 711/171 |
| 5,586,285 | A * | 12/1996 | Hasbun et al. | 711/103 |
| 5,802,553 | A * | 9/1998 | Robinson et al. | 711/103 |
| 5,930,167 | A * | 7/1999 | Lee et al. | 365/185.03 |
| 5,943,692 | A * | 8/1999 | Marberg et al. | 711/203 |
| 6,145,069 | A * | 11/2000 | Dye | 711/170 |
| 7,596,657 | B2 * | 9/2009 | Kaler | 711/103 |
| 2002/0103960 | A1 | 8/2002 | Sinclair | |
| 2002/0116424 | A1 * | 8/2002 | Radermacher et al. | 708/203 |
| 2004/0250009 | A1 | 12/2004 | Chen et al. | |
| 2004/0250011 | A1 * | 12/2004 | Chen et al. | 711/103 |
| 2006/0212645 | A1 * | 9/2006 | Petersen et al. | 711/103 |
| 2007/0005625 | A1 | 1/2007 | Lekatsas et al. | |
| 2007/0005911 | A1 | 1/2007 | Yang et al. | |
| 2007/0285980 | A1 * | 12/2007 | Shimizu et al. | 365/185.03 |
| 2007/0291571 | A1 * | 12/2007 | Balasundaram | 365/227 |
| 2008/0005450 | A1 * | 1/2008 | Bangalore | 711/103 |
| 2008/0228998 | A1 * | 9/2008 | Colecchia et al. | 711/103 |
| 2008/0301256 | A1 * | 12/2008 | McWilliams et al. | 709/214 |
| 2010/0017578 | A1 * | 1/2010 | Mansson et al. | 711/171 |
| 2011/0161559 | A1 * | 6/2011 | Yurzola et al. | 711/103 |

OTHER PUBLICATIONS

Webster's Online Dictionary. "gzip.".*
Eran Gal and Sivan Toledo. "Algorithms and Data Structures for Flash Memories." Jun. 2005. ACM. ACM Computing Surveys. vol. 37. Iss. 2.*
Steven Wells and Don Clay. "Flash Solid-State Drive with 6MB/s Read/Write Channel and Data Compression." Feb. 1993. ISSCC '93.*

(Continued)

Primary Examiner — Nathan Sadler
(74) Attorney, Agent, or Firm — Dicke, Billig & Czaja, PLLC

(57) ABSTRACT

Methods for programming compressed data to a memory array, memory devices, and memory systems are disclosed. In one such method, memory pages or blocks that are partially programmed with valid data are found. The data is collected from these partially programmed pages or blocks and the data is compressed. The compressed data is then programmed back to different locations in the memory array of the memory device.

19 Claims, 3 Drawing Sheets

(56) References Cited

OTHER PUBLICATIONS

Wen-Tzeng Huang, Chun-Ta Chen, Yen-Sheng Chen, and Chin-Hsing Chen. "A Compression Layer for NAND Type Flash Memory Systems." Jul. 2005. IEEE. ICITA 2005.*
Keun Soo Yim, Hyokyung Bahn, and Kern Koh. "A Flash Compression Layer for SmartMedia Card Systems." Feb. 2004. IEEE. IEEE Transactions on Consumer Electronics. vol. 50. No. 1. pp. 192-197.*
Giovanni De Micheli. Synthesis and Optimization of Digital Circuits. 1994. McGraw-Hill. pp. 443-455.*
David A. Patterson and John L. Hennessy. Computer Organization and Design. 1998. Morgan Kaufmann. $2^{nd}$ ed. p. 541.*
Andrew Birrell et al. "A Design for High-Performance Flash Disks." Apr. 2007. ACM. ACM SIGOPS Operating Systems Review. vol. 41. pp. 88-93.*
M. Kjelso, et al. "Memory Management in Flash-Memory Disks with Data Compression", International Workshop IWMM, Sep. 27, 1995, Pgs. 399-413.
European Search Report for EP Application No. 09794961.4, dated Aug. 25, 2011, 7 Pgs.
European Office Action for EP Application No. 09794961.4, dated Sep. 8, 2014, 6 Pgs.

\* cited by examiner

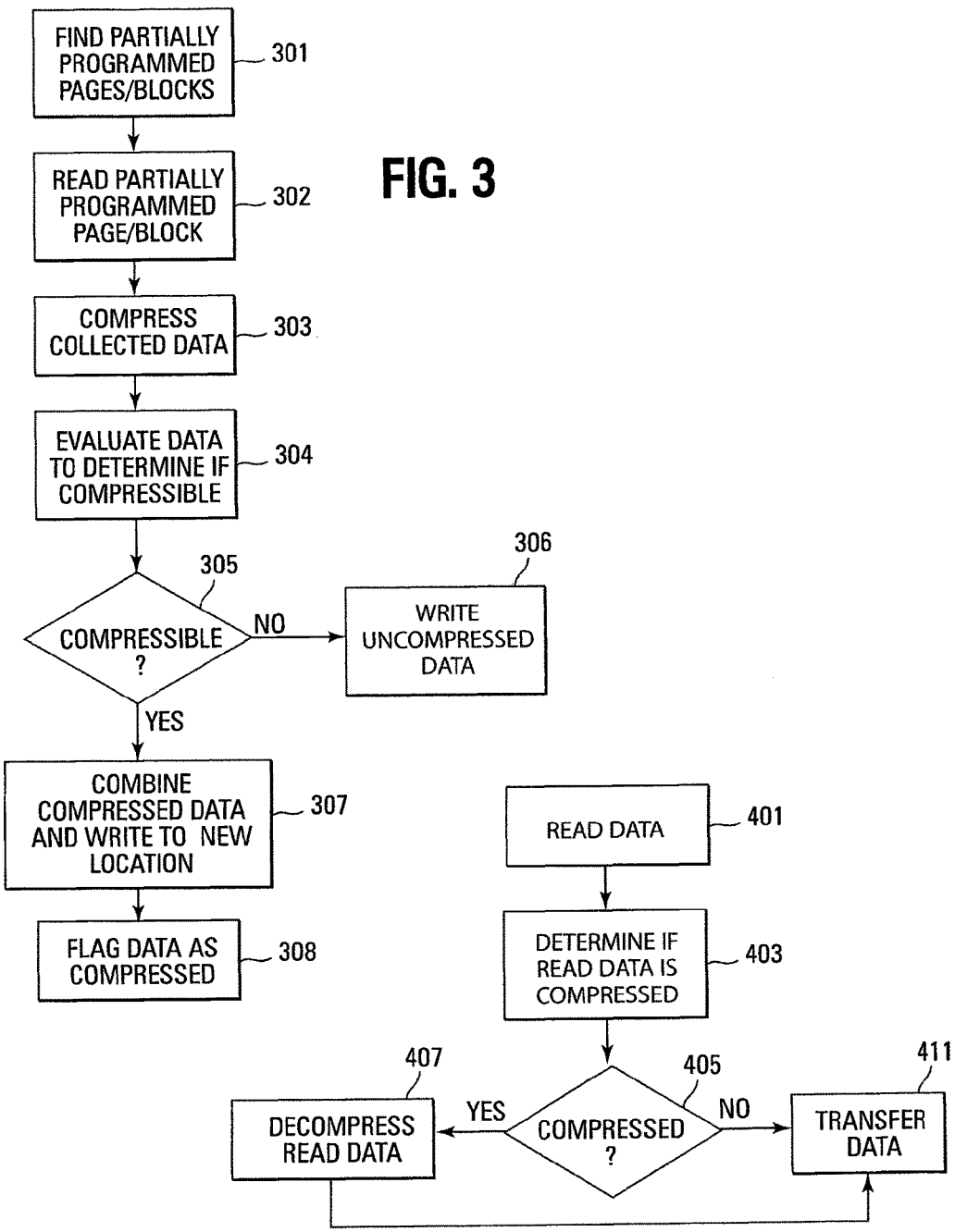

US 9,772,936 B2

DATA COLLECTION AND COMPRESSION IN A SOLID STATE STORAGE DEVICE

TECHNICAL FIELD OF THE INVENTION

The present invention relates generally to memory devices and in a particular embodiment the present invention relates to non-volatile memory devices.

BACKGROUND OF THE INVENTION

Memory devices can include internal, semiconductor, integrated circuits in computers or other electronic devices. There are many different types of memory including random-access memory (RAM), read only memory (ROM), dynamic random access memory (DRAM), static RAM (SRAM), synchronous dynamic RAM (SDRAM), and flash memory.

Flash memory devices have developed into a popular source of non-volatile memory for a wide range of electronic applications. Flash memory devices typically use a one-transistor memory cell that allows for high memory densities, high reliability, and low power consumption. Common uses for flash memory include personal computers, personal digital assistants (PDAs), digital cameras, and cellular telephones. Program code and system data such as a basic input/output system (BIOS) are typically stored in flash memory devices for use in personal computer systems.

One drawback to flash memory devices is that, due to the physical process used to program, they typically only operate properly for a limited quantity of erase/program cycles. Most flash memory devices can operate for 100k erase/program cycles.

Another drawback is that the cost per bit of storage is relatively high compared to other memory technologies. Thus, the management of the memory cells in a flash memory array needs to be improved to efficiently use as much of the memory array as possible so that memory areas do not go unused.

For the reasons stated above, and for other reasons stated below that will become apparent to those skilled in the art upon reading and understanding the present specification, there is a need in the art for a way to improve non-volatile memory management.

BRIEF DESCRIPTION OF THE DRAWINGS

FIG. 3 shows flowchart of one embodiment of a method for performing a data collection with data compression.

FIG. 4 shows a flowchart of one embodiment of a method for reading compressed data.

DETAILED DESCRIPTION

Figure 1:
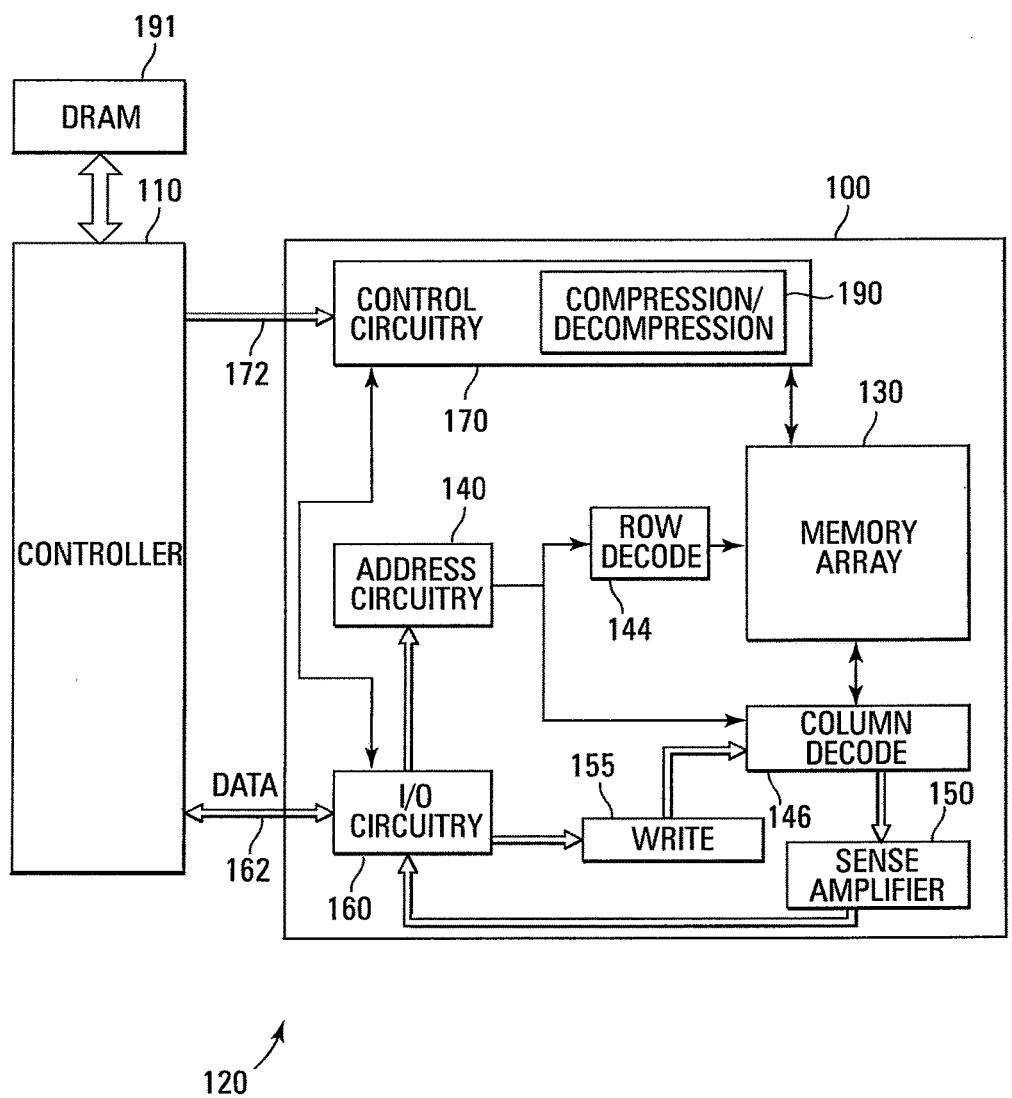
FIG. 1 shows a block diagram of one embodiment of a memory system that incorporates one embodiment of the data collection with data compression method.

In the following detailed description of the invention, reference is made to the accompanying drawings that form a part hereof and in which is shown, by way of illustration, specific embodiments in which the invention may be practiced. In the drawings, like numerals describe substantially similar components throughout the several views. These embodiments are described in sufficient detail to enable those skilled in the art to practice the invention. Other embodiments may be utilized and structural, logical, and electrical changes may be made without departing from the scope of the present invention. The following detailed description is, therefore, not to be taken in a limiting sense, and the scope of the present invention is defined only by the appended claims and equivalents thereof.

FIG. 1 illustrates a functional block diagram of a memory system 120 that includes a solid state storage device 100. The solid state storage device 100 can be non-volatile memory 100 such as flash memory. The solid state storage device 100 has been simplified to focus on features of the memory that are helpful in understanding the present programming embodiments. The solid state storage device 100 is coupled to an external system controller 110. The controller 110 may be a microprocessor or some other type of control circuitry.

Figure 2:
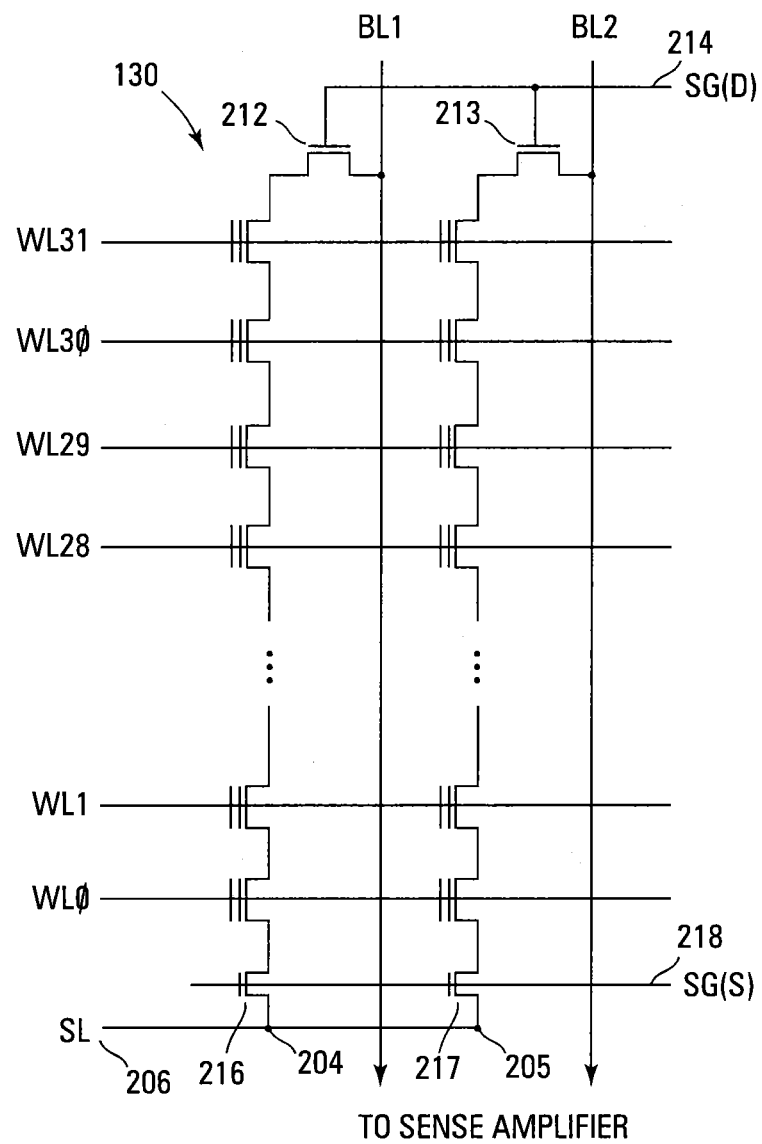
FIG. 2 shows a schematic diagram of one embodiment of a portion of a non-volatile memory array in accordance with the memory array of FIG. 1.

The solid state storage device 100 includes an array 130 of non-volatile memory cells, such as the floating gate memory cells that are illustrated in FIG. 2 and discussed subsequently. The memory array 130 is arranged in banks of access lines such as word line rows and data lines such as bit line columns. In one embodiment, the columns of the memory array 130 are comprised of series strings of memory cells. As is well known in the art, the connections of the cells to the bit lines determines whether the array is a NAND architecture, an AND architecture, or a NOR architecture.

The memory array 130 can be organized into memory blocks. The quantity of memory blocks is typically determined by the size of the memory device (i.e., 512 MB, 1 GB). In one embodiment, each memory block is formed by 64 pages of memory cells. Each page is typically comprised of 2048 bytes of data.

Memory control circuitry 170 can include/cooperate with a compression/decompression block 190 so that uncompressed data being written to the array 130 can be compressed and compressed data read from the array 130 can be decompressed. The compression/decompression 190 can be accomplished through a hardware circuit that performs these tasks. An alternate embodiment performs the compression/decompression 190 through a firmware routine.

A volatile memory area (e.g., DRAM) 191 is provided to temporarily store data. The volatile memory is used by the controller 110 to temporarily store data to be written to the memory array 130, to temporarily store data read from the memory array, and to store other data used by the memory control circuitry 170. For example, as described subsequently, the compression/decompression block 190 can use the volatile memory 191 to store data.

Address buffer circuitry 140 is provided to latch address signals provided through the I/O circuitry 160. Address signals are received and decoded by a row decoder 144 and a column decoder 146 to access the memory array 130. It will be appreciated by those skilled in the art, with the benefit of the present description, that the number of address input connections depends on the density and architecture of the memory array 130. That is, the number of addresses increases with both increased memory cell counts and increased bank and block counts.

The solid state storage device 100 reads data in the memory array 130 by sensing voltage or current changes in the memory array columns using sense amplifier circuitry 150. The sense amplifier circuitry 150, in one embodiment, is coupled to read and latch a row of data from the memory array 130. Data input and output buffer circuitry 160 is included for bidirectional data communication as well as address communication over a plurality of data connections 162 with the controller 110. Write circuitry 155 is provided to write data to the memory array.

The memory control circuitry 170 decodes signals provided on control connections 172 from the controller 110. These signals are used to control the operations on the memory array 130, including data read, data write (program), and erase operations. The memory control circuitry 170 may be a state machine, a sequencer, or some other type of controller to generate the memory control signals. The control circuitry 170 is configured to perform the data collection operations discussed subsequently. Additionally, if the compression/decompression operations 190 are firmware routines, the memory control circuitry 170 is configured to perform compression/decompression as well as the embodiment of the method of FIG. 3.

FIG. 2 illustrates a schematic diagram of a portion of a NAND architecture memory array 130 comprising series strings of non-volatile memory cells on which the embodiments of the subsequently discussed data collection and compression/decompression can operate. While the subsequent discussions refer to a NAND memory device, the present embodiments are not limited to such an architecture but can be used in other memory device architectures as well.

The memory array is comprised of an array of non-volatile memory cells 130 (e.g., floating gate) arranged in columns such as series strings 204, 205. Each of the cells 130 are coupled drain to source in each series string 204, 205. A word line WL0-WL31 that spans across multiple series strings 204, 205 is connected to the control gates of each memory cell in a row in order to bias the control gates of the memory cells in the row. The bit lines BL1, BL2 are eventually connected to sense amplifiers (not shown) that detect the state of each cell by sensing current on a particular bit line.

Each series string 204, 205 of memory cells is coupled to a source line 206 by a source select gate 216, 217 and to an individual bit line BL1, BL2 by a drain select gate 212, 213. The source select gates 216, 217 are controlled by a source select gate control line SG(S) 218 coupled to their control gates. The drain select gates 212, 213 are controlled by a drain select gate control line SG(D) 214.

Each memory cell can be programmed as a single level cell (SLC) or multilevel cell (MLC). Each cell's threshold voltage ($V_t$) is indicative of the data that is stored in the cell. For example, in an SLC, a $V_t$ of 0.5V might indicate a programmed cell while a $V_t$ of −0.5V might indicate an erased cell. The MLC may have multiple $V_t$ ranges that each indicate a different state. Multilevel cells can take advantage of the analog nature of a traditional flash cell by assigning a bit pattern to a specific voltage range stored on the cell. This technology permits the storage of two or more bits per cell, depending on the quantity of voltage ranges assigned to the cell.

Data compression, also referred to in the art as source coding, is the process of transforming an original string of data into a new string of data that contains the same or substantially the same information as the original string but whose length is reduced. Data compression can be either lossy or lossless.

Lossless data compression retains the same original information while using fewer bits. This type of data compression typically cannot accomplish as much compression as the lossy compression but is used in situations where data loss cannot be tolerated as in program source code. Examples of typical lossless data compression algorithms include Lempel-Ziv (LZ) compression, DEFLATE, PKZIP, and GZIP. The embodiments of the present disclosure are not limited to any one type of compression/decompression.

FIG. 3 illustrates a flowchart of one embodiment of a method for data collection and compression. The data collection operation determines which memory pages and/or memory blocks are only partially programmed 301 with valid data (valid data can be the programmed information that should actually be programmed in that particular page and that has not been moved to another location). This can be accomplished by reading the pages/blocks to determine which are only partially programmed. In another embodiment, the partially programmed pages/blocks can be identified (e.g., flagged) at the time that portions of the data from the page/block is moved. In this embodiment, a bit can be set in a page or block status register that indicates only part of the page/block retains valid data. Later, the read operation only has to read the status bit to find the partially programmed pages/blocks.

Partially programmed memory pages and memory blocks can typically result from three scenarios. One cause of a partially programmed memory page is that not enough write traffic occurs to fill a memory page and the controller writes the data it has so that the storage device can signal completion of the operation to the system. Another cause of partially programmed memory pages is that a piece of data is written to a logical block on the device while that same logical block is already contained in a previously written page. The previously written block is now marked "invalid" by that page now has an empty spot available within it and is a data collection candidate. Finally, a less common scenario is that the system sends a command to the device instructing it to invalidate a logical block. If that logical block is part of a previously filled page, this page now is a data collection candidate.

These operations can leave a page or block only partially programmed with valid data that has not been moved. The data collection provides the opportunity to read the memory contents and make the compression a background task.

The valid data in these partially programmed memory pages/blocks is read out 302. The read data 302 is input to the compression block and simultaneously to the DRAM of the solid state storage device. The data is compressed 303 and temporarily stored in a different region of the DRAM. One of the above-described compression routines can be used or some other compression routine can be used. The compression can be accomplished in either hardware or software.

At the completion of the transfer, the compression is evaluated to determine if the data was compressible 304. If the data is not compressible 305, the uncompressed data is written to the memory pages 306.

If the data is compressible 305, the compressed data is combined with other compressed data to fill a memory page 307. In one embodiment, one memory page might contain two pages worth of data.

The compressed data is flagged as compressed 308 so that when it is read, it can be recognized as compressed data in order to be decompressed. Such a flag can include a bit indication in a separate memory location of the memory array (e.g., DRAM translation tables) or a register that is part of the memory control circuitry. The type of compression associated with the compressed data can also be indicated by a similar bit or multiple bit indication in a memory location/register. In another embodiment, all data being written to the memory array is compressed so that the read operation decompresses all read data.

FIG. 4 illustrates one embodiment of a method for reading data from a solid state storage device. Data is initially read from the memory cells 401. This can be accomplished by reading a digital pattern from each cell in a memory array that operates digitally or determining a threshold voltage for each read memory cell in a memory array that operates in an analog fashion.

It is then determined if the read data had been compressed 403 when written or if the data is already in an uncompressed format. As previously discussed, it might be assumed that all read data is in a compressed format, thus requiring decompression for all read data, or a compression indication bit needs to be read for the associated data. In one embodiment, it can also be determined the type of compression algorithm used so that the same decompression algorithm can be used during decompression.

If the data has been compressed 405, it is then decompressed 407, in accordance with the compression algorithm used to compress it, and the decompressed data transferred to the requesting routine 411. If the data had been stored in an uncompressed state 405, the read data is transferred in the same form that it was read 411.

CONCLUSION

In summary, one or more embodiments perform a data collection by reading the valid data remaining in partially programmed memory blocks and groups the valid data together, compresses it, and stores it in a new memory block such that the new memory block is filled. The partially programmed block is then erased and returned for future use. This rewriting of valid data is typically referred to as write amplification since the amount of writing actually occurring is amplified when compared to the amount of original data being written into the memory device. The resulting increased memory capacity reduces the write amplification by spreading out the wear-leveling performed by the memory control circuitry.

Although specific embodiments have been illustrated and described herein, it will be appreciated by those of ordinary skill in the art that any arrangement that is calculated to achieve the same purpose may be substituted for the specific embodiments shown. Many adaptations of the invention will be apparent to those of ordinary skill in the art. Accordingly, this application is intended to cover any adaptations or variations of the invention. It is manifestly intended that this invention be limited only by the following claims and equivalents thereof.

What is claimed is:

1. A method for data collection and compression in a memory device having a memory array, the method comprising:
   determining whether memory pages of the memory array are only partially programmed with valid data by reading a status bit for each page, wherein the partially programmed memory pages have an unprogrammed area;
   reading the valid data from the partially programmed memory pages in response to the respective status bit for each memory page;
   compressing the read data in response to the respective status bit for each memory page; and
   programming the compressed data back to the memory array.

2. The method of claim 1 wherein compressing the read data comprises using a GZIP algorithm to compress the read data.

3. The method of claim 2 and further including reading the compressed data from the memory array and using one of Lempel-Ziv (LZ) compression, DEFLATE, and GZIP to decompress the compressed data.

4. The method of claim 1 and further including programming an indication that the read data has been compressed.

5. The method of claim 1 and further including identifying a type of compression algorithm used in compressing the data.

6. The method of claim 1 and further including erasing the partially programmed memory pages after reading the data from the partially programmed memory pages.

7. The method of claim 1 and further including generating an indication that a first memory page is only partially programmed with valid data when data is moved from the first memory page.

8. The method of claim 1 and further including combining the compressed data with other compressed data prior to programming back to the memory array.

9. A memory device comprising:
   a memory array organized in a plurality of memory pages and blocks; and
   memory control circuitry, coupled to the memory array, for controlling operation of the memory device, the memory control circuitry configured to read a register comprising status bits indicating whether a respective memory page or memory block has only been partially programmed such that the respective memory page or memory block has an unprogrammed area, read data from the partially programmed pages or blocks in response to their respective status bit, compress the read data in response to their respective status bit, and program the compressed data to alternate locations of the memory array.

10. The memory device of claim 9 wherein the memory array is a NAND architecture flash memory array.

11. The memory device of claim 9 wherein each memory block is comprised of a plurality of memory pages.

12. The memory device of claim 9 wherein the memory control circuitry is further configured to generate an indication that the read data has been compressed and program the indication in memory.

13. The memory device of claim 9 wherein a circuit performs the compression.

14. The memory device of claim 9 wherein the compression is performed by a firmware routine.

15. The memory device of claim 9 wherein the memory control circuitry is further configured to compress all data that is written to the memory array.

16. A memory system comprising:
   a controller for controlling operation of the memory system with memory signals;
   a DRAM coupled to the controller; and
   a solid state storage device, coupled to the controller and operating in response to the memory signals, the solid state storage device comprising:
      an array of non-volatile memory cells organized in memory pages or blocks; and
      memory control circuitry coupled to the array of memory cells and configured to find partially programmed memory blocks or pages that have unprogrammed areas by reading a status bit associated with each of the memory pages or blocks, read in response to each status bit valid data programmed in the partially programmed memory blocks or pages, compress the read data in response to each status bit, write the compressed data to the DRAM, identify the type of compression, and write both the compressed data from the DRAM and an indication of the type of compression to fill a memory block or page.

17. The memory system of claim 16 wherein the memory control circuitry is further configured to perform wear leveling by writing the compressed data to a plurality of physical addresses in response to a write operation to one logical address.

18. The memory system of claim 17 wherein the memory control circuitry is further configured to erase the partially programmed memory blocks.

19. The memory system of claim 16 wherein the memory control circuitry is further configured to read the indication of the type of compression and decompress the compressed data in response to the indication of the type of compression.

* * * * *